June 16, 1953 — L. O. FRENCH — 2,642,315
FUEL INJECTION APPARATUS
Filed Nov. 21, 1951
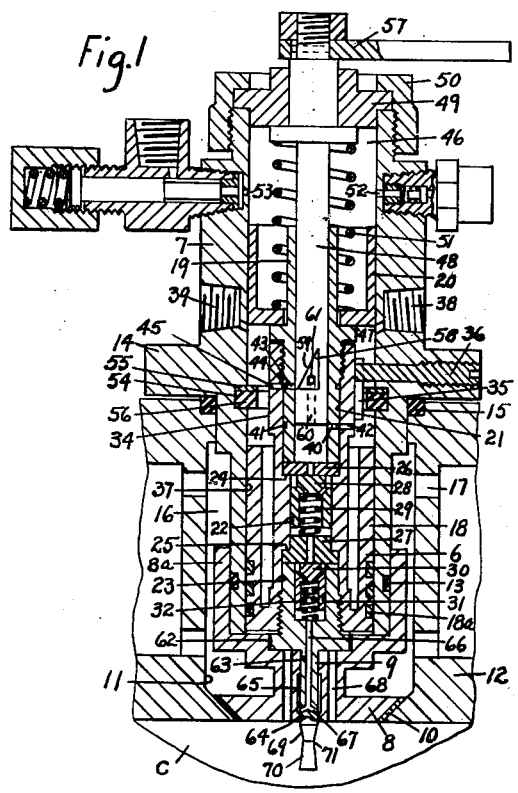
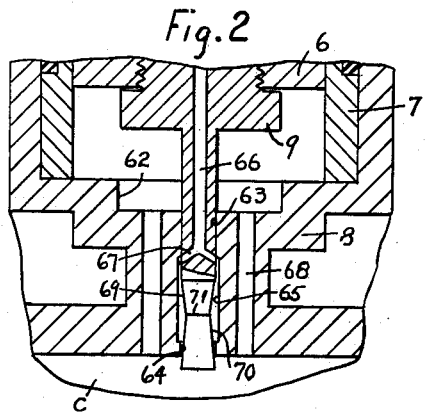
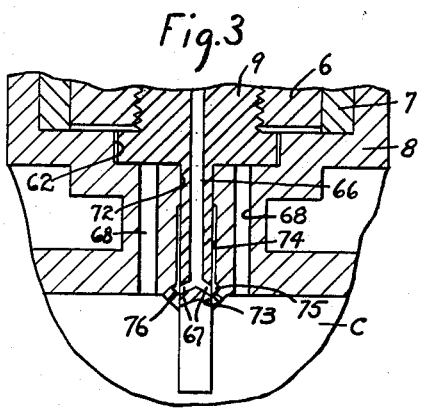
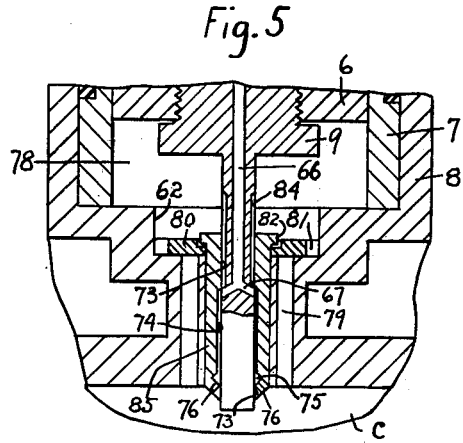
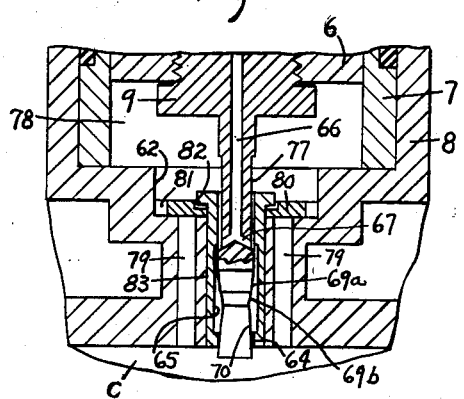
INVENTOR.
Louis O. French Patented June 16, 1953

2,642,315

UNITED STATES PATENT OFFICE 2,642,315

FUEL INJECTION APPARATUS

Louis O. French, Milwaukee, Wis.

Application November 21, 1951, Serial No. 257,525

10 Claims. (Cl. 299—107.2)

The invention relates to internal combustion engines and more particularly to fuel injection apparatus of the compression pressure operated type.

The simplest compression pressure operated injectors are those in which the nozzle, mounted at the lower end of the operating piston, projects into the engine cylinder and moves with said piston, but in some engines the shape of the combustion chamber is such that a shifting of the position of the spray nozzle is objectionable. One of the objects of this invention is to provide a compression pressure operated unit injector having a fixed nozzle cooperating with the operating piston which works in a chamber whose inner end is connected by a passage or passages with the combustion chamber of the engine. The present invention permits a unit compression pressure operated fuel injector to function as a unit with a fuel nozzle having a fixed spraying position.

A further object of the invention is to provide a new and improved fuel injection engine in which the injection apparatus provides for both a direct injection of fuel and also for injection of fuel by utilizing the chamber in which the operating piston works, as a precombustion or energy cell chamber into which some of the fuel from the injector is diverted and which during the cycle may react to provide a blast effect on other parts of the fuel charge. The present invention enables the advantages of the precombustion or energy cell types of engines to be obtained without their disadvantages since the injector has direct injection (easier starting) and gas blast characteristics and the chamber in which the gas blast is generated is substantially completely scavenged during each cycle. Furthermore, the injection process may be even more rapid than that obtainable with the usual compression operated injector since the precombustion of a part of the charge in the chamber in which the operating piston of the injector works will produce a higher pressure in this chamber than the pressure then existing in the main combustion chamber and thus accelerate the movement of the operating piston. At the same time the action of the blast gases on the fuel supplied by the injector are of advantage in reducing the ignition lag of the fuel and in permitting cheaper fuels to be used than are ordinarily employed in direct injection engines.

A further object of the invention is to provide a compression pressure operated fuel injector in which a projection on the operating piston cooperates with a fixed opening to form a pintle type nozzle.

A further object of the invention is to provide an improved compression pressure operated injector.

A further object of the invention is to provide an improved fuel nozzle for compression pressure operated injectors.

The invention further consists in the several features hereinafter set forth and more particularly defined by claims at the conclusion hereof.

In the drawings:

Fig. 1 is a vertical sectional view of fuel injection apparatus embodying the invention;

Fig. 2 is an enlarged detailed sectional view of the atomizing end of the injector shown in Fig. 1 in a different position;

Fig. 3 is a view of a modified form of atomizer;

Fig. 4 is an enlarged detailed sectional view similar to Fig. 2 showing certain modifications;

Fig. 5 is an enlarged detailed sectional view similar to Fig. 3 showing certain modifications.

Referring to Fig. 1, a compression pressure operated fuel injector in which the operating piston 6 has a constant stroke has been shown, but it will be understood that the nozzle improvements hereinafter described are applicable to variable stroke injectors of this kind as, for example, the injector shown in my U. S. Patent No. 2,516,692, dated July 25, 1950. Also while the fuel injection apparatus herein described has been designed with special reference to compression ignition engines using oil as fuel, it may be used in connection with spark ignition volatile fuel engines such as the high compression (12 to 1) type where suitable provisions known to the art are provided for lubricating the pump plunger and other parts, if necessary.

The operating piston 6 works in a chamber here shown as formed by a cylinder 7 and a bottom and nozzle member 8, the piston having a discharge extension 9 which cooperates with the nozzle member 8.

The member 8 seats at its inner end against a gasket 10 lining the bottom end of a bore 11 in the engine cylinder head 12 and has a cup-shaped top 8a into which the lower end of the cylinder 7 closely fits with a packing ring 13 between these parts.

The upper end of the cylinder 7 has an outwardly extending flange 14 which engages a packing ring 15 mounted in a recess in the head at the top of the bore 11 which provides a water jacket space 16 either forming a part of or connected by openings 17 with the main jacket space of the head. Bolts (not shown) or other suitable fastening means engaging the flange 14 act to clamp the bottom of the cylinder 7 against the bottom of the cup of member 8 and to clamp member 8 against the head.

The operating piston 6 has a main portion 18, a fuel pump barrel 19, and a checking piston portion 20. The main portion 18 may carry sealing rings 18a and has a central bore of varying diameters 21, 22, and 23 providing shoulders 24 and 25. The upper end of the bore 21 is threaded to engage the threaded portion of the barrel 19 which acts to clamp an apertured valve seat member 26 against the shoulder 24. The lower end of the bore 23 is threaded to engage the threaded upper portion of the extension 9 whose plain cylindrical upper end abuts an apertured valve seat member 27 and clamps said seat member against the shoulder 25, the flange of said extension providing a wrench engaging surface. A check valve 28, slidably mounted in the bore 22, is normally held by a spring 29 against the seat 26. A check valve 30, slidably mounted in a central disposed bore 31 of the extension, is normally held by a spring 32 against the seat 27. The part 18 has a wrench engageable boss 34 provided with a lengthwise extending key slot 35 cooperating with a key pin 36 anchored in the cylinder 7. The parts 18 and 20 are preferably of light weight metal, such as a suitable aluminum or titanium alloy, the part 18 preferably being cored out so that the interior of the piston is efficiently cooled by a coolant which is circulated through a portion of the bore 37 of the cylinder 7 between the parts 18 and 20, this coolant being introduced through an inlet supply connection 38 and exhausted through an outlet 39. For compression ignition engines the coolant is the fuel.

The barrel 19 has an inlet port 40 connected with an annular groove 41 connected by a port 42 with the coolant space and a relief port 43 connected with an annular groove 44 connected by a port 45 with said coolant space. Where fuel is not used as a coolant, then the supply and exhaust of fuel from the barrel through the ports 40 and 43 is through passages connected with the checking chamber 46. The barrel 19 has a wrench engageable flange 47 whose top is a finished flat surface against which the annular bottom of the piston 20 abuts in fluid sealing engagement. Piston 20 is free of the upper extension of the barrel 19 so that it has a self-centering contact with the bore 38.

A fuel pump plunger 48 works in the barrel 19 and is rotatably mounted in fluid sealed relation with a cap 49 clamped by a nut 50 to the upper end of the cylinder 7. A spring 51 interposed between the flange on the plunger and the bottom of the piston part 20 acts to hold the plunger against the cap, the part 20 against the flange of the barrel and to move the piston 6 to its lower position.

For timing the beginning of movement of the operating piston and also to cushion the end of its operating movement, I follow my U. S. Patent No. 2,516,690, dated July 25, 1950, and provide the chamber 46 with a check valve controlled inlet 52 and a variable pressure relief valve controlled outlet 53 for timing and let the piston 20 lap the outlet port for checking the final movement of the piston 6. Also to further seal the piston 18, the bore of the cylinder 7 is provided with an annular groove 54 in which a split metal ring 55 and a packing ring 56 of neoprene or silicone rubber composition is mounted, the ring 56 being engaged by the top edge of the piston part 18 at the end of its outward or upward stroke.

The fuel pump shown is of the constant stroke variable by-pass controlled type in which the angular adjustment of the plunger by a lever 57 varies the position of its by-pass scroll or recess 58 relative to the relief port 43 and thereby varies the amount of fuel delivered past the discharge valves 28 and 30. By way of example I have shown the inlet port 40 in the barrel controlled by the plunger and the recess 58 of angular form provided with a control edge 59 cooperating with the port 43, this recess being connected by suitable indicated passages 60 and 61 in the plunger with the fuel pump chamber. As in all devices of this kind, the compression pressure of the engine acting on the exposed end of the piston 6 near the end of the compression stroke moves it outwardly relative to the combustion chamber C and against the force of the spring 51, and in the present instance the loading of the relief valve to force the fuel past the discharge valves. On a reduction in cylinder pressure the spring 51 returns the operating piston to its initial position, and this movement substantially completely scavenges the chamber containing said piston. It will be noted that if any gas leakage past the main portion of the piston 6 occurs during the outward movement of the piston, these gases will be carried away by the coolant circulating in the space of the bore 37 back of this piston by way of the ports 38 and 39.

Referring to Figs. 1 and 2, the nozzle member 8 has alined centrally disposed bores 62, 63, and 64 with a slight annular enlargement 65 between the bores 63 and 64. The flanged end of the extension seats in the recess formed by the bore 62 when the piston 6 is down and the lower cylindrical end of the extension 9 is slidably mounted at all times in the bores 63 and 64. The bore 31 is connected by a conduit 66 to connecting passages 67 which register with the enlargement 65. Passages 68 in the member 8 connect the lower end of the operating piston chamber with the combustion chamber C. The lower part of the extension cooperates with the lower or orifice bore 64 to form a pintle type nozzle by which fuel discharged past the check valves and through the passages above named is sprayed into the combustion chamber of the engine during the upward movement of the piston 6 as it moves from the position shown in Fig. 1 to the position shown in Fig. 2. The pintle may have various arrangements of conical surfaces cooperating with the orifice bore 64 such as the inwardly converging conical surface 69 and the outwardly diverging conical surface 70 to provide a constriction 71. Instead of a single surface 69, this surface may be broken up into two conical surfaces 69a and 69b of differing angles, as shown in Fig. 4. The conical surfaces on the pintle vary the nozzle orifice area formed between it and the bore 64 as the piston 6 moves to its full stroke position so as to vary the rate of discharge of the fuel through this orifice and also serve to deflect the spray, the pintle preferably projecting beyond the orifice 64 at the end of the stroke of piston 6.

Where greater penetration and directional control of the spray is desired, the extension 9 as shown in Fig. 3 is formed as a plain cylindrical pin that is slidably mounted in the concentric bores 72, 73 connected by a slightly enlarged bore 74 and an annular recess 75. Spray orifices 76 connect the recess 75 with the combustion chamber C. The gas passages and fuel passages are similar to the first form and similarly numeralled. With this arrangement a small amount of the fuel is discharged through the orifice formed between the pin and the bore 73 while the greater portion of the charge is discharged through the orifices 76 into the combustion chamber of the engine on the upward movement of the piston 6. The above constructions provide a direct injection of fuel into the combustion chamber from a fixedly positioned orifice during the injection stroke of the operating piston. For obtaining a combination of direct fuel injection and blast gas injection the nozzles shown in Figs. 4 and 5 are shown.

In Fig. 4 the pintle portion of the extension shown in Fig. 2 has been modified by providing an annular groove 77 extending upwardly from the passages 67 so that at some point, either at the same time or after the initial direct injection of the charge through the orifice 64, some of the fuel will be injected into the chamber 78 and mix with the hot compressed air therein. This injection of fuel into the chamber 78 may start at about half stroke travel of the piston 6 and continue during the remainder of the stroke or the length of this groove 77 may be such as to start injection of fuel to the chamber either before or after the half stroke travel of the piston 8, or at about the same time as direct fuel injection through the orifice 64 begins. The groove 77, passages 67, and enlargement 65 are so related that when the upper end of the groove starts moving into the chamber 78, communication is established between this chamber and the enlargement 67 so that as fuel introduced into chamber 78 mixes with the compressed air therein and becomes vaporized or ignited, the gases expanding in the chamber 78 may blow down through groove 77 and enlargement 65 and exert a gas blast effect upon the fuel in the enlargement 65 to disperse the fuel through the orifice 64. The passages 79 provide restricted communication between the combustion chamber and the chamber 78 and may be open passages or as shown in Fig. 4 be one-way gas inlet passages having a non-return annular plate check valve 80 mounted over one end thereof and provided with serrations or grooves 81 at its edges. The outward movement of the valve 80 is limited by a flange 82 on a tube 83 which has a drive fit in the main body portion of the jacket bottom member 8 which, in some instances, where a tube such as the tube 83 is used, may be formed as an integral part of the head instead of the separate piece shown in Fig. 1. The valve 80, being a separate member, retains its heat more readily than the jacketed bottom of the chamber 78 and forms a hot surface element for said chamber.

In Fig. 5, the extension shown in Fig. 3 has been modified by providing one or more lengthwise grooves 84 that extend upwardly from passages 67 to perform the same function as the groove 77 to spray fuel into the chamber 78 and allow the expanding mixture of fuel and air to pass from the chamber 78 down into the enlargement 74 and exert a gas blast effect on any fuel in said enlargement and recess 75 to disperse the fuel through the orifices 76 into the combustion chamber of the engine. The passages 79, valve 80, and a tube 85 similar to the tube 83 may be used where a one way movement of the gases direct to the chamber 78 is desired.

In both Figs. 4 and 5, the operating piston 6 is shown at the end of its outward stroke which would be the end of a full stroke injection of the plunger 48, and while the stroke of the piston 6 is constant, the effective stroke of the plunger 48 varies with its angular adjustment relative to the relief port 43 so that the supply of fuel to the nozzle may terminate in some instances in the constructions shown in Figs. 4 and 5 before the groove 77 or grooves 84 register with the chamber 78; but even if this does occur, any fuel remaining in the enlargement adjacent the nozzle may be carried up into the chamber 78 and mix with the air therein to form an expanding mixture which will blow back through the nozzle into the combustion chamber of the engine.

By the term "fixed spray orifice," I mean a spray orifice having a fixed position relative to the combustion chamber of the engine, such as, the orifices 64 or 76.

I desire it to be understood that this invention is not to be limited to any particular form or arrangement of parts except in so far as such limitations are included in the claims.

What I claim as my invention is:

1. In a compression pressure operated fuel injection apparatus for internal combustion engines, the combination of a reciprocatory operating piston movable outwardly of the combustion chamber of the engine by compression pressure, a fuel pump having relatively movable parts including a part movable with said piston and a fuel pressure operated discharge valve; a fuel discharge extension beyond said discharge valve for the discharge end of said pump mounted on said operating piston, a housing for said operating piston including a part communicating with the combustion chamber of the engine and having a bore connected with a fixedly positioned spray orifice communicating with the combustion chamber of the engine, said extension being movable in said bore at all times to supply fuel under pressure to said orifice during the outward movement of said operating piston.

2. In a compression pressure operated fuel injection apparatus for internal combustion engines, the combination with a fixedly positioned spray orifice communicating with the combustion chamber of the engine and a bore communicating therewith, of a compression pressure operated fuel pump including a reciprocatory operating piston movable outwardly of the combustion chamber of the engine by compression pressure and having a fuel discharge conduit extension for receiving fuel at pump injection pressure, said extension working in said bore at all times and having an outlet in constant communication with said spray orifice to conduct fuel at injection pressure thereto during the outward movement of said operating piston, said extension having a closed outer end exposed to the gases in said combustion chamber.

3. The structure as defined in claim 2, in which the outer end of the discharge extension has a pintle portion cooperating with said orifice to form a pintle injection nozzle.

4. In a compression pressure operated fuel injection apparatus for internal combustion engines, the combination with fixedly positioned spray orifices and a bore communicating therewith, of a compression pressure operated fuel pump including a reciprocatory operating piston movable outwardly of the combustion chamber of the engine by compression pressure, a fuel pressure operated discharge valve mounted in said piston and a fuel discharge conduit extension beyond said discharge valve working in said bore at all times for supplying fuel to said spray orifices at fuel injection pressures.

5. In an internal combustion engine, the combination with a chamber communicating with the combustion chamber of the engine and provided with a fixedly positioned fuel spray orifice and a gas passage, a compression pressure operated fuel pump having a reciprocatory piston working in said first named chamber and provided with a fuel discharge conduit extension having an outlet in constant communication with said orifice for supplying fuel at fuel injection pressure thereto for direct injection of fuel into said combustion chamber, and a passage controlled by said extension and connecting with said outlet for supplying fuel to said first named chamber at a predetermined period in the movement of said piston to mix with air entering this chamber from the combustion chamber through said gas passage so that said first named chamber acts as a precombustion chamber for a part of the fuel charge supplied by said pump.

6. The structure as defined in claim 5, in which the gas passage is controlled by a check valve adapted to close under pressure generated in said chamber.

7. In an internal combustion engine, the combination of a compression pressure operated fuel pump and a fixedly positioned spray orifice supplied with fuel by said pump for direct injection of fuel into the combustion chamber of the engine and including a reciprocatory operating piston and a precombustion chamber communicating with the combustion chamber of the engine and in which said operating piston works, means for generating a blast gas in said precombustion chamber during the fuel discharge stroke of said operating piston, and a passage between said precombustion chamber and said spray orifice to permit said blast gas to react on fuel supplied to said fixedly positioned fuel spray orifice.

8. In an internal combustion engine, the combination with a precombustion chamber in restricted communication with the combustion chamber of the engine and provided with a fixedly positioned spray orifice, of a compression pressure operated fuel pump for supplying fuel to said orifice for direct injection of fuel into said combustion chamber and for supplying part of its fuel charge to said precombustion chamber to provide a blast gas, and a passage between said precombustion chamber and said orifice to permit said blast gas to react on fuel supplied to said fixedly positioned fuel spray orifice.

9. In a fuel injection apparatus, the combination of an operating piston movable in response to fluid pressure, a fuel pump having relatively movable parts including a part movable with said piston, a cylinder in which said operating piston works, means for checking the outward movement of said piston comprising a chamber containing a checking fluid and provided with a relief port, a checking piston mounted on said operating piston and working in said chamber and adapted to lap said relief port in the outstroke position of said operating piston to trap a body of checking liquid in said chamber, and a yieldable sealing ring mounted in said cylinder and engaged by said operating piston in its outstroke position to prevent gases leaking by said piston.

10. In a fuel injection apparatus, the combination of an operating piston movable in response to fluid pressure and having a cooling space, a fuel pump having a pump barrel carried by said operating piston, a checking piston mounted on said operating piston, a housing in which said pistons work providing a checking chamber above said checking piston and a coolant chamber between said pistons in communication with the cooling space in said operating piston, means for circulating a coolant through said coolant space, means for supplying said checking chamber with a checking fluid, said checking chamber having a relief port adapted to be lapped by said checking piston to stop the outward movement of said operating piston, means for supplying said pump barrel with fuel, an angularly adjustable fuel metering pump plunger working in said pump barrel, a slidable key connection between said piston and housing disposed in said coolant chamber, and a return spring interposed between said checking piston and said plunger.

LOUIS O. FRENCH.

References Cited in the file of this patent

UNITED STATES PATENTS

| Number | Name | Date |
|--------|------|------|
| 1,990,714 | Skooltvet | Feb. 12, 1935 |
| 2,142,973 | Draper | Jan. 3, 1939 |
| 2,516,690 | French | July 25, 1950 |
| 2,516,691 | French | July 25, 1950 |
| 2,516,692 | French | July 25, 1950 |

FOREIGN PATENTS

| Number | Country | Date |
|--------|---------|------|
| 298,399 | Great Britain | Oct. 11, 1928 |